(12) United States Patent
Büermann et al.

(10) Patent No.: US 7,682,236 B2
(45) Date of Patent: Mar. 23, 2010

(54) HARVESTED CROP PROCESSING UNIT WITH SELECTABLE GUIDE RAILS OF DIFFERING INCLINATIONS

(75) Inventors: Martin Büermann, Hornbach (DE); Klaus E. Becker, East Moline, IL (US); Klaus A. Braunhardt, Ottumwa, IA (US); Peter Pirro, Wallhaben (DE)

(73) Assignee: Deere & Company, Moline, IL (US)

( * ) Notice: Subject to any disclaimer, the term of this patent is extended or adjusted under 35 U.S.C. 154(b) by 7 days.

(21) Appl. No.: 11/844,767

(22) Filed: Aug. 24, 2007

(65) Prior Publication Data
US 2008/0058040 A1 Mar. 6, 2008

(30) Foreign Application Priority Data
Aug. 31, 2006 (DE) ........................ 10 2006 040 979

(51) Int. Cl.
*A01F 12/28* (2006.01)
(52) U.S. Cl. .................................................... 460/109
(58) Field of Classification Search .................. 480/59, 480/62, 66, 71, 72, 79–81, 107–110
See application file for complete search history.

(56) References Cited

U.S. PATENT DOCUMENTS

| | | | |
|---|---|---|---|
| 3,529,645 A | 9/1970 | Murray et al. | |
| 3,828,793 A | 8/1974 | Gochanour | |
| 4,244,380 A | 1/1981 | Depauw et al. | |
| 4,258,726 A | 3/1981 | Glaser et al. | |
| RE31,257 E | * 5/1983 | Glaser et al. | 460/80 |
| 4,610,127 A | * 9/1986 | Eguchi et al. | 56/14.6 |
| 5,913,724 A | * 6/1999 | Roberg | 460/83 |
| 6,152,820 A | * 11/2000 | Heidjann et al. | 460/112 |

FOREIGN PATENT DOCUMENTS

GB 2354691 A1 4/2001

OTHER PUBLICATIONS

European Search Report dated Dec. 20, 2007, (5 pages).

* cited by examiner

*Primary Examiner*—Thomas B Will
*Assistant Examiner*—Mai T Nguyen

(57) ABSTRACT

The invention concerns a harvested crop processing unit with a rotor, a rotor housing enclosing the rotor, a cover element of the rotor housing, and a first group of helical guide rails that can be moved relative to the cover element between an operating position in which they are located underneath the cover element in engagement with harvested crop and a non-operating position in which they are located above the cover element.

The invention proposes that a second group of helical guide rails be provided that can be moved alternately with the first group of helical guide rails relative to the cover element between an operating position in which they are located underneath the cover element in engagement with harvested crop and a non-operating position in which they are located above the cover element, and that are provided with an inclination that differs from the inclination of the guide rail of the first group.

3 Claims, 5 Drawing Sheets

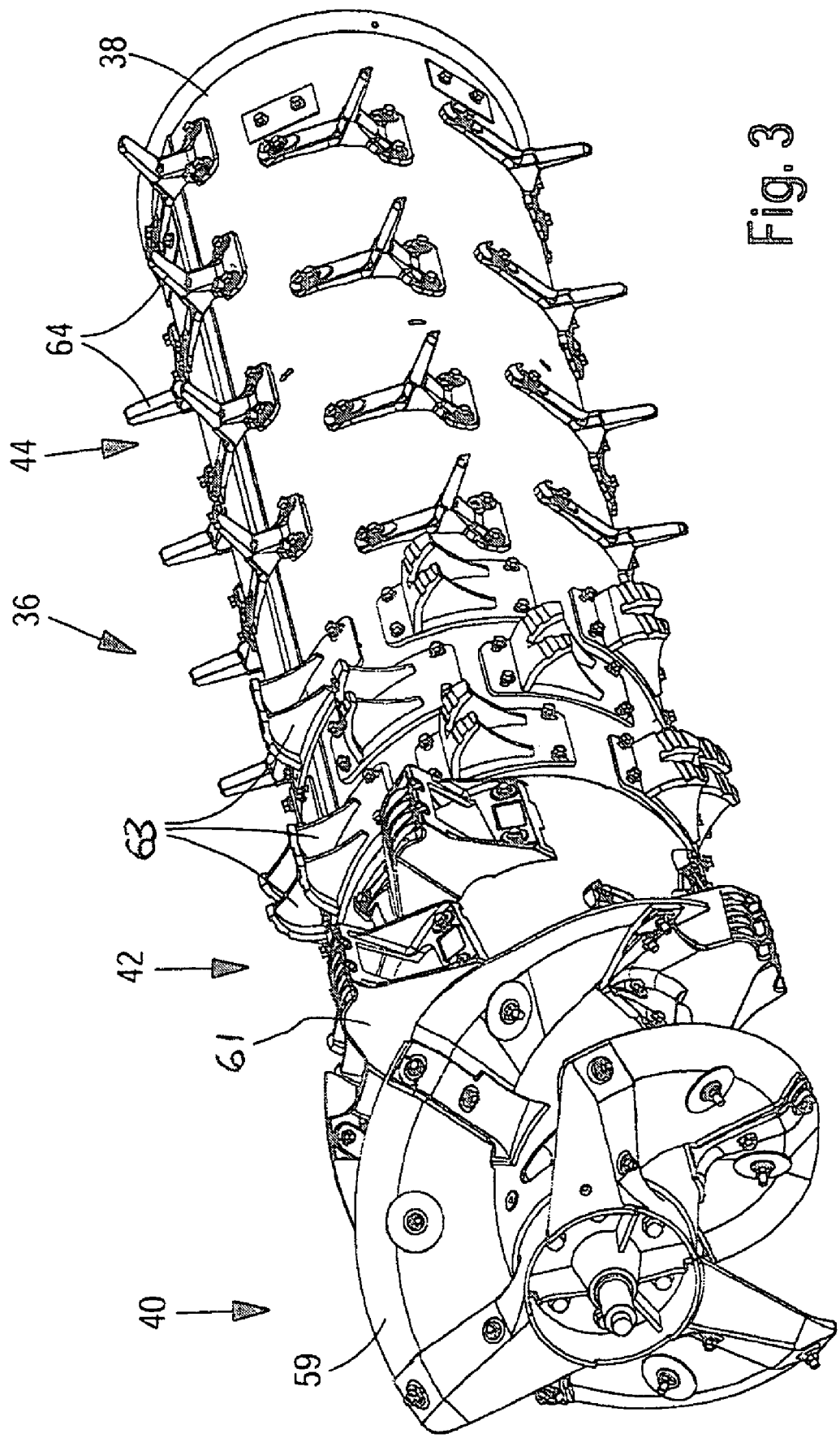

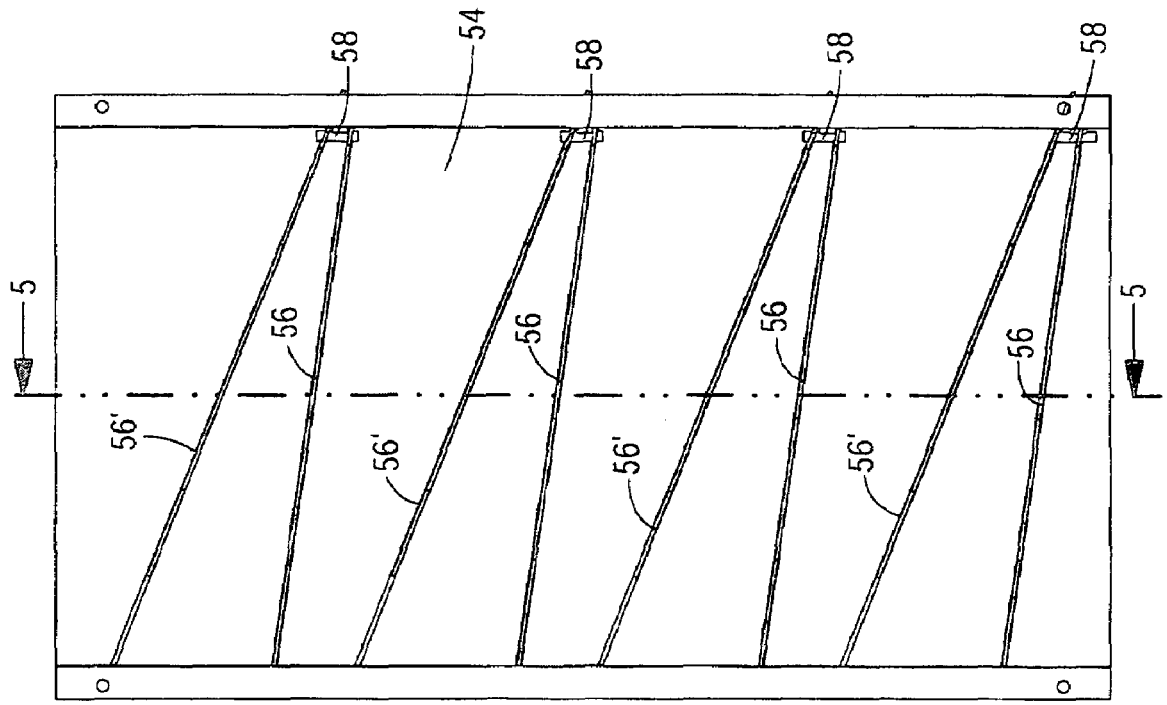

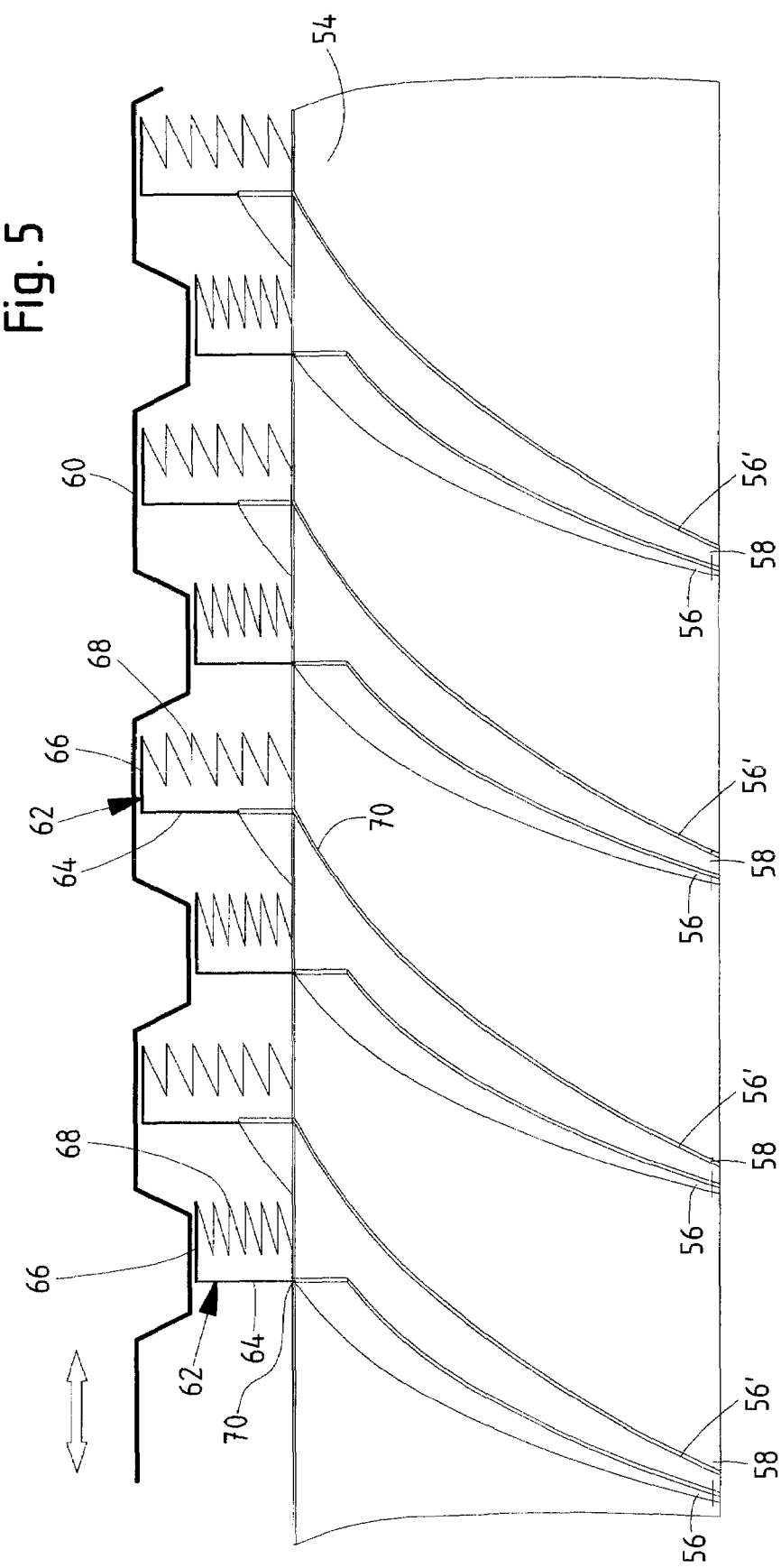

HARVESTED CROP PROCESSING UNIT WITH SELECTABLE GUIDE RAILS OF DIFFERING INCLINATIONS

FIELD OF THE INVENTION

The invention concerns a harvested crop processing unit with a rotor, a rotor housing enclosing the rotor that includes a cover element, and a first group of helical guide rails that can be moved with respect to the cover element between an operating position in which they are located underneath the cover element in engagement with harvested crop and a non-operating position in which they are located above the cover element.

BACKGROUND OF THE INVENTION

Agricultural combines are large machines that harvest, thresh, separate and clean harvested agricultural crops, such as corn. The resulting clean corn is stored in a corn tank (or "grain tank") arranged on the combine. Rotary combines are provided with one or two rotors arranged in a rotor housing which are provided for threshing and separating the harvested crop. In most rotary combines the rotor or rotors are arranged along the longitudinal axis of the combine. These rotors are equipped with a charging (or "inlet") section that accepts harvested crop, which was harvested from the field, a threshing section for the threshing of harvested crop received from the charging section and a separating section for the separating the corn that is still contained in the harvested crop which was received from the threshing section. During the rotation of the rotor the crop is moved in the longitudinal direction from the charging section of the rotor through the threshing section to the separating section. In the separating section the axial movement of the harvested crop is attained by helical guide rails that are arranged underneath the cover element of the rotor housing. The residence time of the harvested crop in the separating section is a function of the inclination of the guide rails, that is, the angle of inclination between the guide rails and the radius of the rotor.

U.S. Pat. No. 4,244,380 proposes that the guide rails be repositioned together on the upper side of the rotor housing in order to make the inclination of the guide rails conform to the type of the crop and its characteristics. The guide rails are fastened with their first ends, free to pivot, about the rotor housing and connected with their second ends with an adjusting rod, that can be slid in the axial direction of the rotor. The sliding of the adjusting rod permits a variation in the inclination of the guide rails. However, these also result in gaps between the guide rails and the rotor housing since the radius of curvature of the guide rails, that are rigid in themselves, may not conform in all positions to the radius of curvature of the rotor housing with which the guide rails are in contact. Harvested crop accumulates in the gaps that may make it difficult or impossible to reposition the guide rails without any previous cleaning of the gap.

Moreover, U.S. Pat. No. 4,258,726, that is seen as forming a class, proposes other possibilities for repositioning guide rails of an axial harvested crop processing arrangement.

SUMMARY OF THE INVENTION

A harvested crop processing unit includes a rotor housing with a rotor arranged within it.

The rotor housing includes a cover element with helical guide rails. The invention proposes that a first group of guide rails and a second group of guide rails be provided that can be moved in each case alternately between an operating position underneath the underside of the cover element and a non-operating position above the underside of the cover element. The inclinations, that is, the angles between the guide rails and the radius of the rotor differ in the case of the guide rails of the two groups.

In this way the result is that with simple and reliable means the inclination of the guide rails can be selected and made to conform to the particular type of harvested crop and the characteristics of the particular harvested crop.

The cover element with the guide rails that can be selected, as mentioned above, is preferably located in a separating section of the harvested crop processing unit. If the latter also includes a threshing section, the cover element can alternately or in addition be arranged at that location.

The cover element, in particular, includes slots through which each of the guide rails can be lowered into the interior of the rotor housing. The guide rails can be shifted or pivoted between the two positions.

The slots are provided in the cover of the rotor housing, each of which is associated with a guide rail. At their upstream ends the guide rails can be pivoted about axis extending coaxially to the axis of rotation of the rotor and can be adjusted in the vertical direction at their downstream ends. Thereby the effective length of the guide rails can be varied.

The guide rails are divided into two sections where the downstream section can be moved in the longitudinal direction of the guide rail so that the length of the guide rail can be varied.

The cover of the rotor housing includes a rotary element that extends over a part of the cover or over the entire cover and that can be arranged on the rotor in several rotary positions. In each rotary position sections of the cover come into engagement with the harvested crop and guide rails of differing inclinations.

The harvested crop is conveyed only over a small angle of rotation of the rotor, this has the disadvantage that the flow of the harvested crop becomes relatively unstable, since more harvested crop accumulates in the region of the rotor housing adjoining the ends of the guide rails which, in turn, results in an irregular separating effect at the grate underneath the rotor. The third embodiment is rather costly since not only several sets of guide rails as well as covers are required.

The purpose underlying the invention is seen in the need to have a harvested crop processing unit of the kind described initially available that makes possible a variation in the inclination of the guide rails in a simple but reliable manner.

This problem is solved according to the invention by the teaching of patent claim 1, where the further patent claims cite characteristics that further develop the solution to great advantage.

BRIEF DESCRIPTION OF THE FIGURES

An embodiment of the invention is explained on the basis of the illustration.

FIG. 3 shows a perspective view of the rotor.

FIG. 4 shows a plan view of the cover of the rotor housing.

FIG. 5 shows a sideways section through the rotor housing and the guide rails arranged therein along the line 5-5 of FIG. 4.

DETAILED DESCRIPTION OF THE PREFERRED EMBODIMENTS

Figure 1:
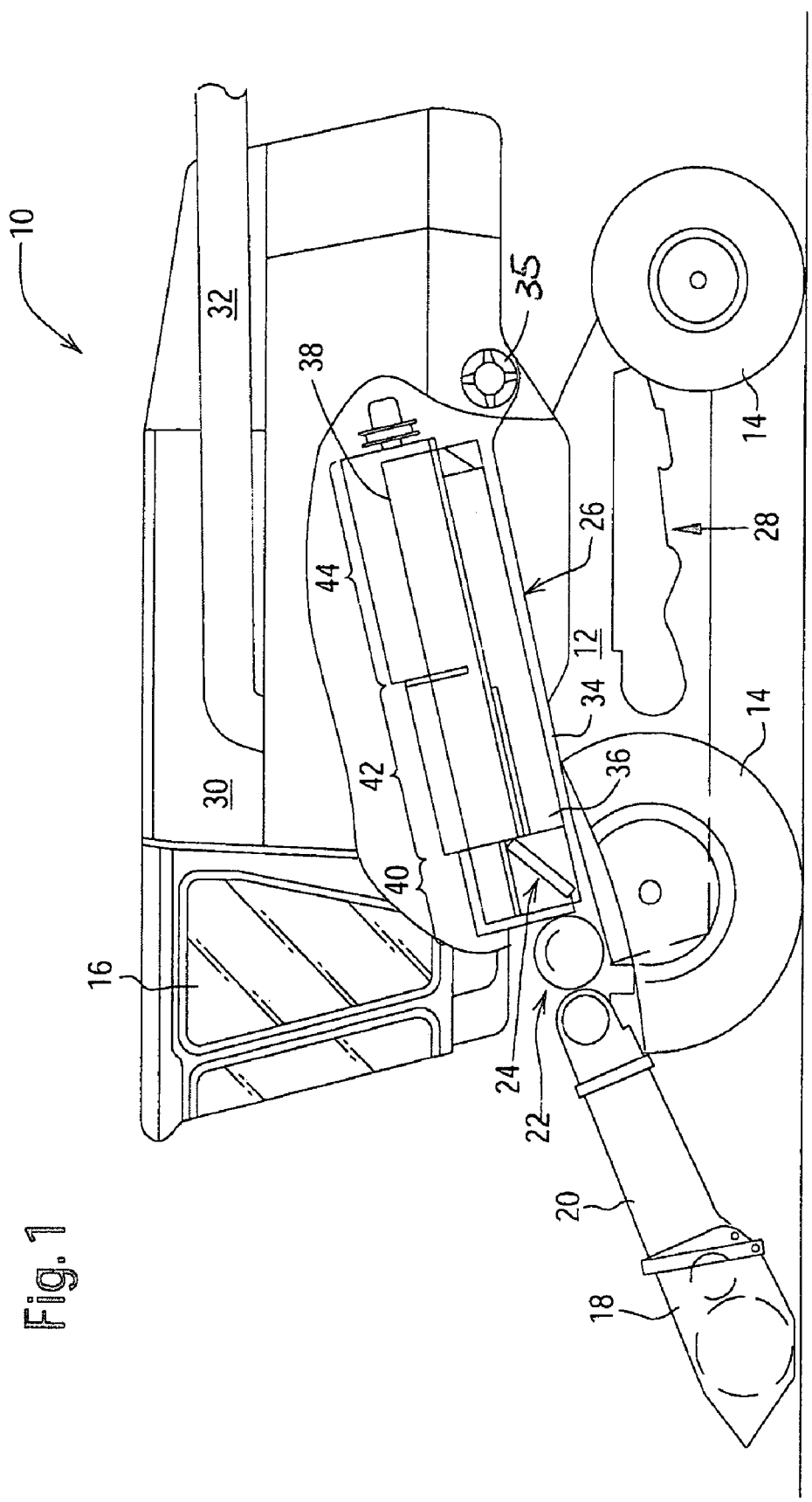
FIG. 1 shows a partial section of a side view of a combine with an axial harvested crop processing unit.

FIG. 1 shows an agricultural combine 10 with a supporting structure 12 with wheels 14 that are engaged with the ground, that are fastened to the structure 12. The operation of the combine 10 is controlled from the operator's cab 16. A cutting head 18 is used to harvest crop containing corn and to conduct it to a slope conveyor 20. The harvested crop is conducted to a guide drum 22 by the slope conveyor 20. The guide drum 22 guides the harvested crop through an inlet transition section 24 to an axial harvested crop processing unit 26.

The harvested crop processing unit 26 includes a rotor housing 34 and a rotor 36 arranged therein. The rotor 36 includes a hollow drum 38 to which crop processing elements are fastened for a charging section 40, a threshing section 42 and a separating section 44. The charging section 40 is arranged on the front side of the harvested crop processing unit 26. The threshing section 42 and the separating section 44 are located downstream in the longitudinal direction and to the rear of the charging section 40. The drum 38 in the charging section 40 is in the shape of a truncated cone. The threshing section 42 includes a forward section in the form of a truncated cone and a rear section in the shape of a cylinder. The cylindrical separating section 44 of the drum 38 is located at the end of the axial harvested crop processing unit 26.

Corn and chaff that fall through a threshing basket 46 and a separating grate 48 are conducted to a cleaning system 28 containing a blower and disk-shaped sieves that can be brought into a swinging movement. The cleaning system 28 removes the chaff and conducts the clean corn to an elevator for clean corn (not shown). The clean corn elevator deposits the clean corn in a corn tank 30. The clean corn in the corn tank 30 can be unloaded by means of an unloading screw conveyor 32 to a corn wagon, trailer or truck. The straw that was threshed out leaves the separating section, is ejected through an outlet of the harvested crop processing unit 26 and conducted to a conveying drum 35. The conveying drum 35, in turn, ejects the straw at the rear side of the combine 10, if necessary after passing through a straw chopper (not shown).

Figure 2:
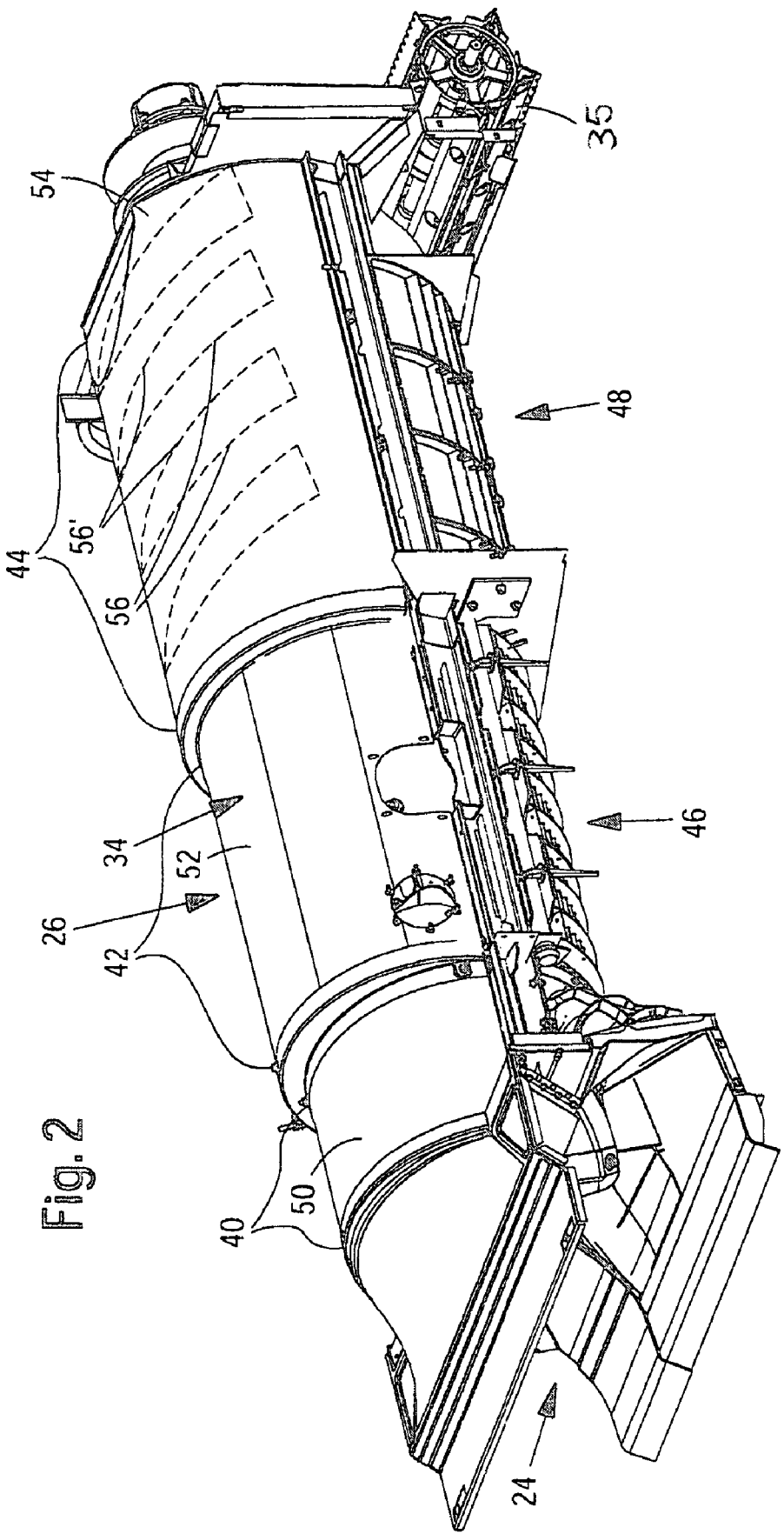
FIG. 2 shows a perspective view of the housing of the harvested crop processing unit.

Reference shall now be made to FIG. 2. Underneath the threshing section 42, the underside of the rotor housing 34 is provided with a grate characterized as threshing basket 46. The separating grate 48 is located underneath the separating section 44. The rotor housing 34 is closed underneath the charging section 50. Cover elements 52, 54, 56 with a semi-circular cross section are arranged on the upper side of the rotor housing 34, each of which is associated with the charging section 40, the threshing section 42 and the separating section 44. The cover element 52 of the threshing section 42 is arranged eccentrically to the axis of rotation of the rotor 36 as is the cover element 54 of the separating section 44, whose eccentricity is greater than that of the cover element 52 of the threshing section 42. Guide rails 56 or 56' are selectively located on the underside of the cover element 54 of the separating section 44.

As shown in FIG. 3, the charging section 40 of the rotor 36 is equipped with helical charging elements 59 in order to engage in the harvested crop received from the guide drum 22. The threshing section 42 of the harvested crop processing unit 26 is equipped with a number of threshing tines 61, 63 for the threshing of the harvested crop received from the charging section. The corn that was threshed in the threshing section 42 and broken loose is separated in the separating section 44 and from the harvested crop that differs from corn by separating fingers 64 that separate and raise that portion of harvested crop that differ from corn.

FIGS. 4 and 5 show a plan view and a vertical section through the cover element 54 of the separating section 44 in the direction of operation. Guide rails 56 are arranged immediately below the cover element 54. Two groups of guide rails are provided: a first groups of guide rails 56 that are provided with a relatively small inclination in the axial direction, and a second group of guide rails 56' that are provided with a greater inclination in the axial direction than the first group of guide rails 56. Both groups enclose at least approximately the same angular region of the rotor 36. In each case only the first group of guide rails 56 or only the second group of guide rails 56' can be positioned on the underside of the cover element 54, while the other group (56' or 56) are then located in each case above the underside of the cover element 54.

For this purpose the mechanism shown in FIG. 5 is provided. The guide rails 56, 56' are connected, free to pivot, at their leading ends, as seen in the direction of rotation of the rotor 36, about pivot axis 58 extending parallel to the axis of rotation of the rotor 36, they are connected, free to pivot, to the cover element 54. At the center of the cover element 54 the guide rails 56, 56' are connected in each case with rectangular connecting elements 62 that include a leg 64 extending vertically and connected to the guide rail 56 or 56' and a leg 66 extending horizontally in the axial direction of the rotor 36 arranged on the upper side of the vertical leg 64 extending vertically. The connecting elements 62 are located above, the cover element 54. In each case helical springs 68 are arranged between the horizontal legs 66 and the cover element 54 and bias the associated guide rails 56 or 56' to a non-operating position above the cover element. A guide rail operating arrangement includes the connecting elements 62, the helical springs 68 and a shift plate 60 arranged above the connecting elements, mounted for being slid back and forth in the direction of operation and designed to alternately move the connecting elements 62 together with the guide rails 56 or 56' either downward against the force of springs 68 to thereby move the rails 56 or 56' from their non-operating position to an operating position within the interior of the rotor housing 34, or to release the compressed springs 68 to permit the springs to extend and alternately return guide rails 56 or 56' to the non-operating position. The cover element 54 is provided with slots 70 in the region of the guide rails 56, 56', these slots permit the guide rails 56, 56' to perform the movement described. Accordingly, either the guide rails 56 or the guide rails 56' are in engagement with the harvested crop as a function of the position of the shift plate 60, while the other guide rails 56 are then in a non-operating position.

The shift plate 60 can be moved by the operator in the operator's cab 16 by means of an appropriate mechanism or a switch is attached there that is connected to an actuator actuated by external forces which moves the shift plate 60. The shift plate 60 could also be replaced by a rotary crankshaft, not shown. The shift plate 60 (or the crankshaft) could also be arranged on the end of the guide rail 56 or 56' shown at left in FIG. 4 (that is trailing in the direction of rotation of the rotor 36).

During the operation harvested crop is conveyed by the guide drum 22 across the inlet transition section 24 into the axial harvested crop processing unit 26. The harvested crop is drawn between the helical conveying elements 59 on the front section of the rotor 36 that is shaped as a truncated cone and the housing 34 into the axial harvested crop processing unit 26. The impact upon the helical conveying elements 59 and the housing 34 throws the corn away from the harvested crop. The shape and the curvature of the helical conveying elements 59 moves the harvested crop to the rear in the direction of the threshing section 42 of the axial crop processing unit 26. The threshing section 42 provides an additional threshing effect by means of a frictional action when the harvested crop moves between the threshing tines 61 and 63 and the housing 34. After being threshed out, the harvested crop is then processed further until it reaches the separating section 44. At this point in the processing operation most of the corn has been extracted from the harvested crop. When the harvested crop enters the separating section 44, the threshing fingers 64 separate the material in the harvested crop that differs from the corn from the corn itself which then reaches the cleaning system 28 through the separating grate 48.

The axial movement of the harvested crop in the separating region 44 is defined by the inclination of the guide rails 56 or 56'. If harvested crop requires a longer residence time in the separating region on the basis of the type of the crop or some other characteristic, such as moisture or the like, the arrangement, according to the invention, permits the guide rails 56 to be brought into their effective position. On the basis of the relatively low inclination of the guide rails 56, the harvested crop is conveyed further during a rotation of the rotor 36 only through a small axial path, so that it remains in the separating section relatively long. Analogously, the guide rails 56' are brought into their effective position if the harvested crop requires only a relatively brief residence time in the separating section. Then it is moved through a larger axial path during one rotation of the rotor 36 on the basis of the greater inclination of the guide rails 56'. The selection of the guide rails 56 or 56' can be performed by the operator on the basis of the type of harvested crop and/or other characteristics (for example, moisture and/or degree of ripeness), or a control arrangement is provided that can be supplied with information regarding the type of harvested crop and/or the aforementioned characteristics of the harvested crop and which moves the shift plate 60 automatically by means of an actuator (not shown) actuated by external forces. A sensor may also be provided to detect the amount of harvested crop in the separating section 44 that brings about a change to the guide rails 56' in the case of a measurement value above the threshold value.

It should be noted that various modifications of the embodiment described here are possible. In that way the harvested crop processing unit 26 could be provided with only one separating section 44 or only one charging section 40 and one separating section 44 and which is preceded by a conventional tangential threshing arrangement. Two such harvested crop processing units 26 or such as described above could be arranged side-by-side alongside each other. It would also be conceivable that the guide rails 56, 56' not be pivoted about the axes 58, but be slid between the operating and non-operating positions. For this purpose appropriate mechanisms that correspond, in particular, to the shift plate 60 as shown or the crankshaft mentioned could engage both ends of the guide rails 56, or 56' or some point in between.

The invention claimed is:

1. A harvested crop processing unit, comprising:
   a rotor,
   a rotor housing enclosing the rotor, the rotor housing further comprising:
      a cover element, said cover element having slots therein;
      a first group of helical guide rails mounted for movement relative to the cover element between an operating position in which they are located underneath the cover element for engaging the harvested crop and a non-operating position in which they are located above the cover element;
      a second group of helical guide rails mounted for movement in alternation with the first group of helical guide rails relative to the cover element between an operating position in which they are located underneath the cover element in engagement with the harvested crop and a non-operating position in which they are located above the cover element, wherein the second group of helical guide rails are provided with an inclination that differs from the inclination of the first group of helical guide rails, the helical guide rails being configured to be moved through the slots in the cover element between the operating position and the non-operating position; and
      a guide rail operating arrangement being operatively coupled to said first and second groups of guide rails for alternately moving said first and second groups of guide rails between their respective non-operating and operating positions.

2. The harvested crop processing unit according to claim 1, characterized by the rotor and the rotor housing that include a separating section that is associated with the cover element.

3. An agricultural combine, comprising:
   a supporting structure;
   wheels for engagement with the ground that are mounted on the structure;
   a slope conveyor disposed at the front of the supporting structure;
   a guide drum on the supporting structure that is disposed to receive harvested crop from the slope conveyor; and
   a harvested crop processing unit disposed on the supporting structure to receive harvested crop from the guide drum, the harvested crop processing unit further comprising,
      a rotor,
      a rotor housing enclosing the rotor, the rotor housing further comprising
         a cover element, said cover element having slots therein;
         a first group of helical guide rails that can be moved relative to the cover element between an operating position in which they are located underneath the cover element in engagement with the harvested crop and a non-operating position in which they are located above the cover element;
         a second group of helical guide rails that can be moved in alternation with the first group of helical guide rails relative to the cover element between an operating position in which they are located underneath the cover element in engagement with the harvested crop and a non-operating position in which they are located above the cover element, wherein the second group of helical guide rails are provided with an inclination that differs from the inclination of the first group of helical guide rails, the helical guide rails being configured to be moved through the slots in the cover element between the operating position and the non-operating position; and
         a guide rail operating arrangement being operatively coupled to said first and second groups of helical guide rails, with said guide rail operating arrangement being operable for placing one of said first and second groups of helical guide rails in its non-operating position while simultaneously placing another of said first and second groups of helical guide rails in its operating position.

* * * * *